(12) United States Patent
Hartmann

(10) Patent No.: US 9,245,099 B2
(45) Date of Patent: Jan. 26, 2016

(54) UNLOCKING A SCREEN OF A PORTABLE DEVICE

(71) Applicant: VODAFONE HOLDING GMBH, Duesseldorf (DE)

(72) Inventor: Norman Hartmann, Duesseldorf (DE)

(73) Assignee: VODAFONE HOLDING GMBH, Duesseldorf (DE)

( * ) Notice: Subject to any disclaimer, the term of this patent is extended or adjusted under 35 U.S.C. 154(b) by 0 days.

(21) Appl. No.: 14/141,558

(22) Filed: Dec. 27, 2013

(65) Prior Publication Data
US 2014/0187204 A1 Jul. 3, 2014

(30) Foreign Application Priority Data
Dec. 27, 2012 (EP) .................................. 12008616

(51) Int. Cl.
*H04M 3/16* (2006.01)
*G06F 21/31* (2013.01)
*G06F 1/16* (2006.01)
*G06F 3/01* (2006.01)
*H04M 1/67* (2006.01)
*G06F 3/0346* (2013.01)

(52) U.S. Cl.
CPC ............ *G06F 21/316* (2013.01); *G06F 1/1626* (2013.01); *G06F 1/1694* (2013.01); *G06F 3/017* (2013.01); *G06F 3/0346* (2013.01); *H04M 1/67* (2013.01); *H04M 2250/12* (2013.01)

(58) Field of Classification Search
CPC ... G06F 1/1626; G06F 1/1694; G06F 21/316; G06F 3/017; G06F 3/0346; H04M 1/67; H04M 2250/12

USPC ................... 455/411, 450.1, 566, 574, 575.1, 455/418–420
See application file for complete search history.

(56) References Cited

U.S. PATENT DOCUMENTS

| 2007/0259685 | A1* | 11/2007 | Engblom et al. ............ 455/550.1 |
| 2012/0007713 | A1* | 1/2012 | Nasiri et al. ................... 340/5.81 |
| 2012/0050198 | A1 | 3/2012 | Cannon |

FOREIGN PATENT DOCUMENTS

WO 2011/057287 5/2011

* cited by examiner

*Primary Examiner* — Babar Sarwar
(74) *Attorney, Agent, or Firm* — Grossman, Tucker, Perreault & Pfleger, PLLC

(57) ABSTRACT

The present invention relates to a method for unlocking a screen of a portable device, comprising the steps: detecting movement of the portable device using at least one sensor unit of the portable device; determining a position of the portable device based on data provided by the sensor unit; comparing the determined position with at least one predetermined position to determine whether the determined position relatively matches the predetermined position; and executing an unlock of the screen of said portable device if the determined position relatively matches the predetermined position. Further the present invention relates to a portable device, preferably for the use in a communication network, in particular a mobile network according to a GSM, GPRS and/or UMTS radio network standard, characterized in that said portable device is designed and/or adapted to at least partially carry out a method according to present invention.

12 Claims, 3 Drawing Sheets

UNLOCKING A SCREEN OF A PORTABLE DEVICE

CROSS REFERENCE TO RELATED APPLICATIONS

This application claims priority to European Patent Application No. 12 008 616.0 filed on Dec. 27, 2012, the disclosure of which is incorporated by reference herein in its entirety.

FIELD OF THE INVENTION

The present invention relates to a method for unlocking a screen of a portable device.

BACKGROUND

Furthermore, the present invention relates to a portable device, preferably a portable device for the use in a communication network, in particular a mobile network according to a GSM, GPRS and/or UMTS radio network standard, which portable device is designed and/or adapted to at least partially carry out a method according to the invention.

In the state of the art methods to unlock portable devices, in particular a screen of portable devices, are well known, in particular form so called smartphones comprising a touchscreen. Unlocks are used to get into the operating system of a portable device from an inactive state of the portable device. Especially to prevent that unwanted operations, actions and/or inputs based on accidentally performed actions by the user, portable devices are set to an interactive state when there is no intended usage. Accidentally performed operations, actions and/or inputs by a user can happen for example when a portable device is in a pocket or a bag of the user. To get back into the operating system of the portable device allowing and enabling an user of the portable device operations, actions and/or inputs so called lockscreens are used, offering different kinds of unlocks.

SUMMARY

An example for this is a so called swipe unlock. This unlock is performed by inputting a swipe gesture on the portable device. There are several different swipe unlocks known in the state of the art, for example by dragging an icon displayed on the portable device into a predetermined area.

Further an unlock can be necessary for security reasons, for example to refuse unauthorized persons an access to the portable device. This goal is achieved by requesting a user to input a key, especially a PIN, a code or a gesture, or by letting the user draw a pattern as an input on the screen/display of the portable device to perform the unlock.

The disadvantage of such unlocks is that they might take a long time, are error-prone and require the user to perform several actions. These actions are not performable with one hand only so that the user has to use both of his/her hands.

A further known unlock, which is performed with portable devices comprising a camera, use a face recognition and compare a taken image from the camera with a predetermined image of the user stored in the portable device in order to perform the unlock, if a positive match is given.

A drawback of such an unlock is a relatively high error rate which may result in an unnecessary long unlock for example when the taken images are not significantly recognized. In the worst case the user has to switch back to a conventional unlock, for example a PIN unlock.

Based upon this state of the art it is object of the present invention to improve the unlock of portable devices, in particular with respect to the kind, the speed and the usability to perform an unlock for an user.

To achieve this aim the present invention proposes a method for unlocking a screen of a portable device, comprising the steps:
   detecting movement of the portable device using at least one sensor unit of the portable device;
   determining a position of the portable device based on data provided by the sensor unit;
   comparing the determined position with at least one predetermined position to determine whether the determined position relatively matches the predetermined position; and
   executing an unlock of the screen of said portable device if the determined position relatively matches the predetermined position.

The invention is based upon the knowledge that an unlock of a screen of a portable device is improvable. The unlock according to the present invention is advantageously performable by an user using one hand only and is thus performable more easy and faster, since the unlock is achievable by holding the portable device in a position for the amount of a predetermined time duration with one hand only. Advantageously, no further actions by the user are required. If the position of the portable device relatively matches a predetermined position, the unlock of the screen of the portable device is executed. The advantage is that the unlock is faster, easier and more intuitive for the user, in particular since the use can perform the unlock with one hand only. Another advantage is that an accidentally performed unlock for example in a pocket and/or bag of the user is prevented, especially since it is highly unlikely, that a portable device in a pocket or a bag accidentally performs movements comprising positions according to the invention, in which the determined position relatively matches the predetermined position.

Furthermore, the invention is based upon the knowledge that nearly all available portable devices, in particular smartphones, contain/comprise at least one sensor unit, preferably an accelerometer and/or a gyroscope, so that the method of the present invention is performable with these portable devices.

Common accelerometers of portable devices have a positional accuracy of about 1 degree to about 5 degree differing from the actual position of the portable device to a predetermined position of the portable device, for example relating to the axes of rotation of the portable device. According to this, the suggested method of an unlock is very exact since positions and/or movements are detectable with high resolutions. Furthermore the suggested method of an unlock according to the present invention is more easy and intuitive performable by an user, in particular since users of such smartphones are used to perform operations, actions and/or inputs by moving the smartphone in normal use compared to the use according to the present invention.

Advantageously, the predetermined position is configurable and/or adjustable by the user of the portable device. The user may determine his/her preferred position of the portable device and use this position as the predetermined position in order to perform the easiest, fastest and most intuitive unlock for him/her. This is very comfortable and/or convenient for the user and allows the user the maximum possible individualization of the unlocking according to the present invention.

A preferred embodiment of the invention suggests that the comparing of the determined position includes determining whether the determined position relatively matches the predetermined position for a predetermined time duration. Experiments have shown that this time duration should be as short as possible. This supports a quick and intuitive unlock. According to this the time duration should not be longer than three seconds in order to guarantee the usability of the suggested method of an unlock. Furthermore accidentally performed operations, actions and/or inputs when the portable device is in a pocket or a bag are more preventable, since the determined position has to relatively match the predetermined position within the predetermined time duration.

Another embodiment of the invention provides that the predetermined time duration is configurable and/or adjustable by the user. The method to unlock the portable device is therefore customizable according to the preferences of the user. Advantageously, the configured and/or adjusted time duration should be as short as possible in order to facilitate the unlocking of the portable device. For example the time duration should be set to equal or less than three seconds.

Another embodiment of the invention further comprises detecting an input of the user, in particular pushing a button or key of an entry unit of the portable device, before the detecting of the movement of the portable device by the sensor unit, preferably an accelerometer and/or a gyroscope, is done. The input by the user may be necessary when performing the suggested method of an unlock of some portable devices in order to activate the sensor unit of the portable device when the portable device is in an inactive state so that in particular the detecting of movement of the portable device is achievable. Furthermore, the input of the user may be used to trigger the event of performing the suggested unlock according to the present invention.

An especially advantageous embodiment of the invention is characterized in that the detecting of the input by the user is done until the executing of the unlocking of the screen of the portable device is completed, in particular in terms of pushing and holding the button/key of the portable device. According to the invention, pushing and holding the button/key of the portable device facilitates the unlock to be performed by the user. The user has got an indicator for knowing when the suggested method of the unlock may be performed by pushing and holding the button of the portable device. Furthermore, requiring the pushing and holding of the button/key of the portable device prevents an accidentally performed unlock for example when the portable device is in a pocket and/or bag of the user.

Another embodiment of the invention is characterized in that the determining of a position further comprises determining a direction of the movement based on data provided by the sensor unit, in particular an accelerometer and/or a gyroscope, and wherein the comparing of a predetermined position includes comparing the determined direction of the movement with a predetermined direction to determine whether the determined direction relatively matches the predetermined direction in order to execute the unlock of the screen of said portable device.

Advantageously, the direction of movement of the portable device includes rotating of the portable device around at least one of its axes of rotation and/or shaking of the portable device, which shaking is characterized by a sequence of movements of the portable device with preferably suddenly changing directions of movement, in particular comprising a rotating. The method to unlock a portable device according to the present invention is extended so that different movements are also detectable in order unlock a portable device based on not only holding said portable device in a position matching a predetermined position but by moving said portable device in a direction, rotating said portable device around at least one of its axes of rotation and/or shaking said portable device. These movements are detectable based on data provided by the sensor unit, in particular an accelerometer and/or a gyroscope, of the portable device which are correspondingly interpreted and/or analyzed.

Another embodiment of the invention is characterized in that the direction of movement of the portable device includes a combination of at least two of the following actions:
holding the portable device in a fixed position,
moving the portable device in a direction,
rotating the portable device; and/or
shaking the portable device.

The method to unlock a screen of a portable device suggested by the invention may include a combination of different movements of the portable device respectively holding the portable device in a position. For example the unlock may be done by initially moving the portable device in a direction according to at least one of its axes, for example a moving in a curve or a line horizontal to the ground, in particular form a start position to an end position and/or turning the portable device in parallel in relation to one of the other axes, for example around the Y-axis and/or the Z-axis, followed by holding the portable device in a predetermined position set by the user, without a further movement.

Furthermore, the movement of the portable device includes a combination of at least two different positions of the portable device, at least two different directions of movements of the portable device, at least two different rotations of the portable device and/or at least two different shakings of the portable device. The unlock of the portable device may be further individualized by the user by requiring a combination of at least two different but same kinds of movements of the portable device respectively holding the portable device in two different positions. For example the unlock may require the user to initially hold the portable device in a basically vertical position followed by holding the portable device in a basically horizontal position. Each fixed position may require the user to hold the portable device for a predetermined time duration. The same applies to at least two different directions of movements, at least two different rotations around its axes and at least two different shakings of the portable device.

Another embodiment of the invention further comprises displaying visual cues in order to facilitate the unlock of the screen of the portable device and/or playing acoustic cues in order to facilitate the unlock of the screen of the portable device and/or playing mechanical cues, in particular by vibrating of the portable device, in order to facilitate the unlock of the screen of the portable device. A visual cue may be a kind of crosshair, which indicates the current position of the portable device and gives cues to the user in which direction the portable device has to be moved in order to achieve the predetermined position. Furthermore, in order to achieve the predetermined position of the portable device acoustic cues may be played. For instance the height of a sound is changed to indicate whether the user is holding the portable device in the required position or not. This can also be achieved by playing mechanical cues, for instance different kinds of vibrations of the portable device. Furthermore, to perform the unlock of the different kinds of movements or combinations of movements different cues can be presented by the portable device. For example a user may choose to perform the unlock by using a combination of at least two different directions of movements of the portable device. A visual cue therefore may be for example a kind of labyrinth, in which a ball is displayed and the user may perform the unlock of the portable device by moving the ball from a start to a finish through the labyrinth. This may be achieved by linking respectively adapting the displayed movements of the ball to the determined directions of movements of the portable device provided by the sensor unit.

Another embodiment of the invention further comprises detecting the antenna loss caused by the user operating the portable device and comparing the determined antenna loss with a predetermined antenna loss of the user to determine whether the determined antenna loss relatively matches the predetermined position in order to execute the unlock of said portable device. The suggested method of an unlock may be extended by integrating different attributes and data provided by sensors attached to or comprised by the portable device. To include the antenna loss as a different parameter to consider while performing an unlock is based upon the knowledge that the antenna loss caused by the user operating the portable device is different based on the attributes of the hand of the user. For instance larger hands cause a greater antenna loss than smaller hands based on antennas integrated in portable devices because the antennas are shielded more by larger hands.

Another embodiment of the invention is characterized in that the method is a part of the operating system of said portable device and/or is implemented in the operating system of said portable device. By implementing the suggested method to unlock a screen of a portable device in the operating system of the portable device the unlocking may be performed more efficiently.

The resources of the portable device, for instance the battery power, needed to gain for example the data of the sensor unit, in particular an accelerometer and/or a gyroscope, are significantly lower if the method to unlock is performed directly by the operating system. Furthermore, for the reasons of security it is advantageous to implement the suggested method in the operating system of the portable device, since there are fewer points and/or possibilities to attack, if an unauthorized user wants to gain access to the portable device.

The above mentioned aim is also technically achieved by the invention in that furthermore a portable device, preferably for the use in a communication network, in a particular a mobile network according to the GSM, GPRS and/or UMTS standard is proposed, which portable device is designed and/or adapted to at least partially carry out a method according to the invention.

Further details, characteristics and advantages of the invention will be explained in detail in the following by means of the exemplary embodiments represented in the figures of the drawings.

DETAILED DESCRIPTION

Figure 1:
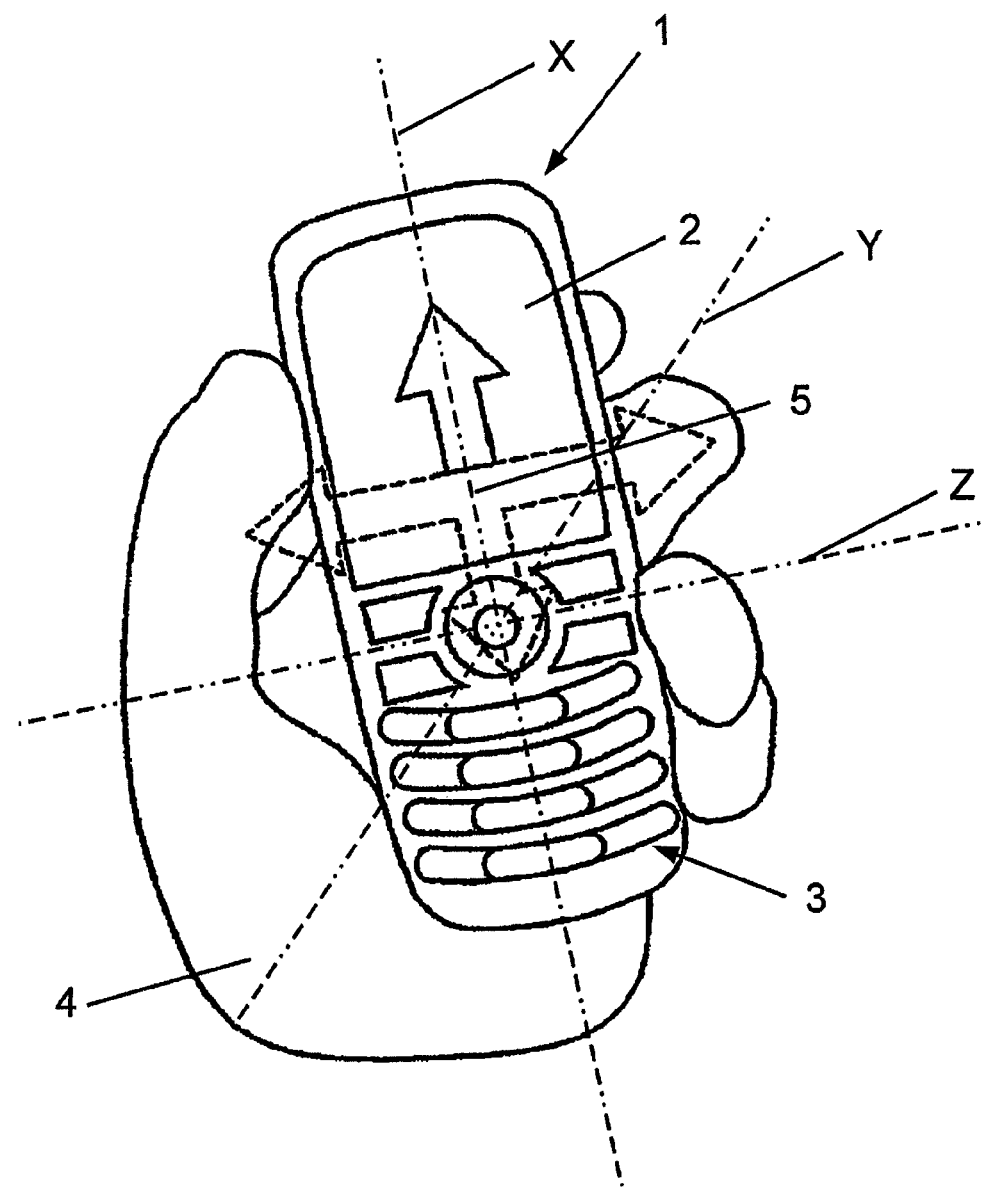
FIG. 1 is a schematic diagram that shows a portable device comprising an accelerometer and FIGS. 2a to e are schematic diagrams that show an exemplary embodiment using visual cues in order to unlock a portable device.

FIG. 1 shows a portable device 1 that may be operated in a mobile network according to a GSM, GPRS and/or UMTS radio network standard, in the present case in form of a mobile phone. The portable device 1 comprises a screen unit or display unit 2 for the visual reproduction of information and/or signals. Herein, the display unit 2 has the form of a display 2. For gathering information and/or signals the portable device 1 comprises an entry unit 3 in the form of a keyboard comprising several keys. Information and/or signals can be gathered or entered via the keys of the keyboard of the entry unit 3 by pressing keys of the keyboard. The portable device 1 further comprises an accelerometer, which detects movement and/or acceleration by the portable device 1. The accelerometer 5 is indicated by the two double arrows marked with the reference numeral 5, which symbolize the movability of the portable device 1. The accelerometer is able to gather information regarding the movement and/or rotations of the portable device 1 along and/or around the X, Y and Z axes.

FIG. 2a to e show the display 2 of an embodiment of the invention. The FIG. 2a to e are in chronologic order, which is indicated by the ascending time 6 displayed on the display unit. The display 2 comprises a visual cue 7. The visual cue 7 comprises a crosshair, which indicates to a user the right direction to move the portable device 1 into a predetermined position in which the portable device 1 is unlockable.

Figure 2A:
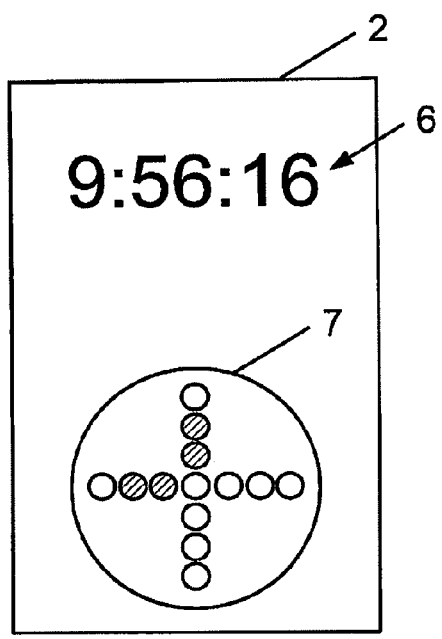
Figure 2B:
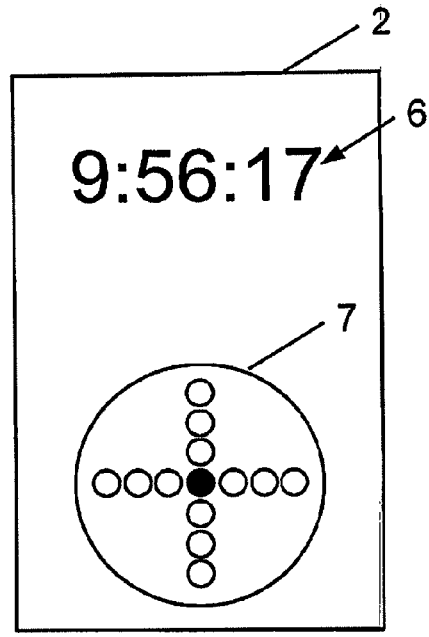
Figure 2C:
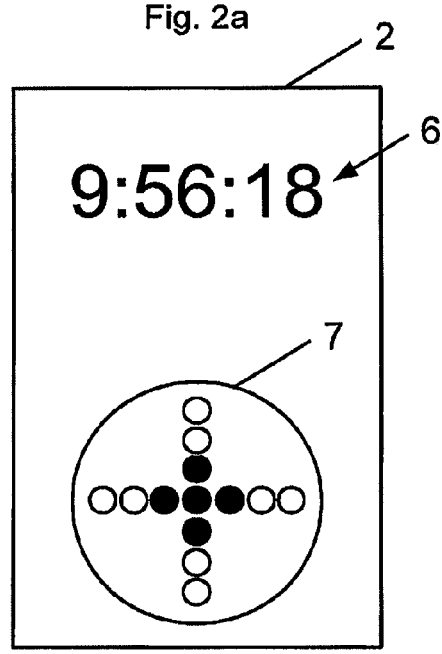

In order to perform the unlock, the portable device 1 detects movements of said portable device using the accelerometer 5, determines a position based on data provided by the accelerometer 5 and compares the determined position with a predetermined position to determine whether the determined position relatively matches the predetermined position. If the current position does not match the predetermined position it is indicated by showing for example red dots on the crosshair of the visual cue 7 (red dots in FIG. 2a are hatched). Furthermore, the user gets information regarding the direction of the predetermined position. In the current case of FIG. 2a four red dots (hatched dots) are shown. This indicates to the user that the portable device 1 is held to far in a horizontal and left like position. If the portable device 1 is held further in this wrong portion even a third set of red dots at the outer ends of the crosshair may appear (not shown).

The user may now correct the current position of the portable device 1 for unlocking the portable device in order to match the predetermined fixed position of the portable device 1. If the current position of the portable device 1 relatively matches the predetermined position the dot in the center of the crosshair of the visual cue 7 turns for example green (green dots in FIG. 2b to e are filled black dots). According to the displayed time 6, the user required one second to find the position of the portable device 1 that relatively matches the predetermined position.

Figure 2D:
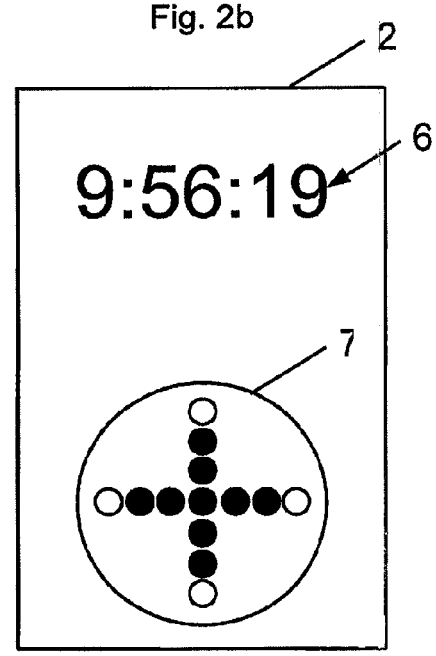

In the present case in order to unlock the portable device 1 the user may hold the portable device 1 in a position for a time duration of three seconds. After about one second four new green dots, in the current case indicated through the use of black dots, appear on the crosshair of the visual cue 7. According to the displaying of the time 6 one second has passed between FIG. 2b and FIG. 2c. After another second another four dots appear on the crosshair of the visual cue, which is shown in FIG. 2d.

Figure 2E:
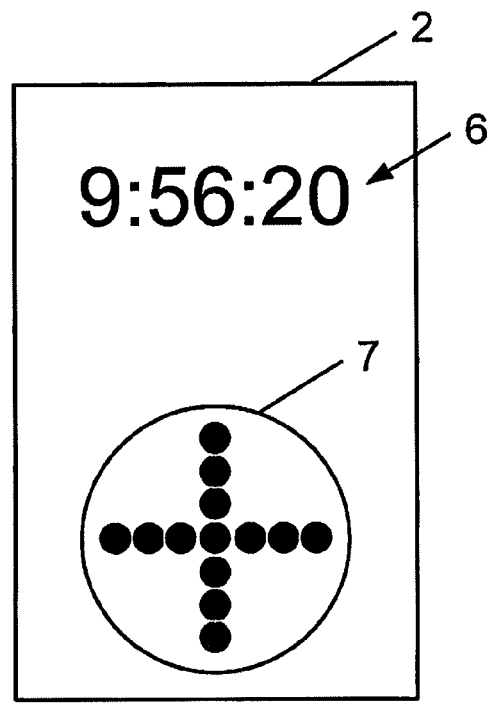

The unlock of the portable device 1 is executed when in total three seconds have passed. This is indicated in FIG. 2e. The crosshair of the visual cue 7 contains only green dots now, in the current case indicated by the use of black dots, to indicate to the user that the holding of the portable device 1 is in the correct position that matches the predetermined position and that the unlock was successful. After the unlock is executed the user may use the portable device as usual.

The exemplary embodiments of the invention represented in the figures of the drawings and described in connection with these ones only serve for explaining the invention and are not limiting for this one.

REFERENCE LIST

1 Portable Device
2 Screen/Display

3 Entry Unit
4 User
5 Sensor Unit/Accelerometer/Gyroscope
6 Time
7 Visual Cue
X axis of movement/rotation
Y axis of movement/rotation
Z axis of movement/rotation

The invention claimed is:

1. A method for unlocking a screen of a portable device, comprising:
 detecting movement of the portable device with at least one sensor unit of the portable device;
 determining a position of the portable device based on data provided by the sensor unit;
 comparing the determined position with at least one predetermined position to determine whether the determined position relatively matches the predetermined position; and
 unlocking the screen of said portable device, when the determined position relatively matches the predetermined position;
 characterized in that
 detecting an input of the use of the portable device by pushing a button/key on an entry unit of the portable device, before the detecting of the movement of the portable device by the sensor unit is done and that
 the detecting of the input by the user is done until the executing of the unlocking of the screen of the portable device is completed in terms of pushing and holding of the button/key on an entry unit of the portable device and in that
 the determining of a position further comprises determining a direction of movement of the portable device based on data provided by the sensor unit and wherein the comparing of a predetermined position includes comparing the determined direction of the movement with a predetermined direction to determine whether the determined direction relatively matches the predetermined direction in order to execute the unlock of the screen of the portable device.

2. The method according to claim 1, wherein the predetermined position is configurable.

3. The method according to claim 1, wherein said comparing comprises determining whether the determined position relatively matches the predetermined position for a predetermined time duration.

4. The method according to claim 3, wherein the predetermined time duration is configurable.

5. The method according to claim 1, wherein detecting said direction of movement comprises detecting a rotation of the portable device around at least one of its axes of rotation (X, Y, Z), detecting a shaking of the portable device, or a combination thereof.

6. The method according to claim 1, wherein detecting said direction of movement of the portable device comprises detecting a combination of at least two of the following actions:
 holding the portable device in a fixed position;
 moving the portable device in a direction;
 rotating the portable device; and
 shaking the portable device.

7. The method according to claim 1, wherein detecting the direction of movement of the portable device includes detecting at least one of:
 a combination of at least two different positions of the portable device;
 movement of the portable device in at least two different directions;
 at least two different rotations of the portable device; or
 at least two different shakings of the portable device.

8. The method according to claim 1, further comprising providing a cue to facilitate said unlocking of the screen of the portable device, said cue comprising one or more of a visual cue, an acoustic cue, or a tactile cue.

9. The method according to claim 1, further comprising:
 determining an antenna loss caused by a user operating the portable device;
 comparing the determined antenna loss with a predetermined antenna loss to determine whether the determined antenna loss relatively matches the predetermined antenna loss; and
 unlocking said screen when the determined antenna loss relatively matches the predetermined antenna loss and when the determined position relatively matches the predetermined position.

10. The method according to claim 1, wherein the sensor unit of the portable device comprises an accelerometer, a gyroscope, or a combination thereof.

11. The method according to claim 1, wherein the method is implemented with the operating system of said portable device.

12. A portable device for the use in a communication network in accordance with at least one of a GSM radio network standard, GPRS radio network standard, or UMTS radio network standard, wherein said portable device is configured to:
 detect movement of the portable device with at least one sensor unit;
 determine a position of the portable device based on data provided by the sensor unit;
 compare the determined position with at least one predetermined position to determine whether the determined position relatively matches the predetermined position; and
 unlock the screen of said portable device, when the determined position relatively matches the predetermined position;
 characterized in that
 detecting an input of the use of the portable device by pushing a button/key on an entry unit of the portable device, before the detecting of the movement of the portable device by the sensor unit is done and that
 the detecting of the input by the user is done until the executing of the unlocking of the screen of the portable device is completed in terms of pushing and holding of the button/key on an entry unit of the portable device and in that
 the determining of a position further comprises determining a direction of movement of the portable device based on data provided by the sensor unit and wherein the comparing of a predetermined position includes comparing the determined direction of the movement with a predetermined direction to determine whether the determined direction relatively matches the predetermined direction in order to execute the unlock of the screen of the portable device.

\* \* \* \* \*